(12) United States Patent
Chalandon et al.

(10) Patent No.: US 9,433,995 B2
(45) Date of Patent: Sep. 6, 2016

(54) METHOD OF MANUFACTURING PRESSURE VESSEL LINERS

(71) Applicant: Luxfer Gas Cylinders Limited, Salford (GB)

(72) Inventors: Bernard Alain Jacques Chalandon, Gerzat (FR); Romary Georges Marcel Daval, Beaumont (FR); Warren Hepples, Nottingham (GB)

(73) Assignee: Luxfer Gas Cylinders Limited (GB)

( * ) Notice: Subject to any disclaimer, the term of this patent is extended or adjusted under 35 U.S.C. 154(b) by 0 days.

(21) Appl. No.: 14/775,187

(22) PCT Filed: Mar. 14, 2014

(86) PCT No.: PCT/GB2014/050788
§ 371 (c)(1),
(2) Date: Sep. 11, 2015

(87) PCT Pub. No.: WO2014/140610
PCT Pub. Date: Sep. 18, 2014

(65) Prior Publication Data
US 2016/0023265 A1 Jan. 28, 2016

(30) Foreign Application Priority Data

Mar. 14, 2013 (FR) ..................... 13 52261

(51) Int. Cl.
*B21D 22/21* (2006.01)
*B21D 51/24* (2006.01)
(Continued)

(52) U.S. Cl.
CPC .............. *B21D 51/24* (2013.01); *B21D 22/21* (2013.01); *B21D 22/28* (2013.01); *B21D 35/006* (2013.01);
(Continued)

(58) Field of Classification Search
CPC .... B21D 22/20; B21D 22/208; B21D 22/21; B21D 22/26; B21D 22/28; B21D 35/006; B21D 51/18; B21D 51/24
See application file for complete search history.

(56) References Cited

U.S. PATENT DOCUMENTS 2,026,133 A  12/1935 Mapes
2,917,823 A * 12/1959 Fletcher ................ B21D 22/26
                                                    72/256
3,893,326 A   7/1975 Oberlander et al.

FOREIGN PATENT DOCUMENTS

FR    2255976 A1   7/1975
GB     754494 A    8/1956
(Continued)

OTHER PUBLICATIONS

International Search Report from corresponding International Application No. PCT/GB2014/050788, mailed May 27, 2014.
(Continued)

*Primary Examiner* — Debra Sullivan
(74) *Attorney, Agent, or Firm* — Polster Lieder

(57) ABSTRACT

A method of manufacturing a liner for use in a pressure vessel includes a cold drawing process that shapes a transition zone (20*b*) part of an aluminum alloy liner shell (10). The transition zone (20*b*) links a thinner walled drum part (18) and a thicker walled end region (20*a*), which is at an open top of the shell. The transition zone (20*b*) may be shaped by the cold drawing process such that it reduces susceptibility of the shell to fracture during removal from a cold drawing press and also redistributes shell material in preparation for a subsequent process in which a threaded neck is formed from the end region (20*a*). This process is particularly suited to processing harder aluminum alloy materials such as AA7060 or AA7032.

16 Claims, 10 Drawing Sheets

(51) Int. Cl.
 *B21D 22/28* (2006.01)
 *B21D 35/00* (2006.01)
 *F17C 1/14* (2006.01)

(52) U.S. Cl.
 CPC ......... *F17C 1/14* (2013.01); *F17C 2201/0109* (2013.01); *F17C 2201/0123* (2013.01); *F17C 2201/058* (2013.01); *F17C 2203/0604* (2013.01); *F17C 2203/067* (2013.01); *F17C 2203/0619* (2013.01); *F17C 2203/0646* (2013.01); *F17C 2203/0648* (2013.01); *F17C 2203/0665* (2013.01); *F17C 2203/0675* (2013.01); *F17C 2209/2181* (2013.01); *F17C 2209/234* (2013.01); *F17C 2221/011* (2013.01); *F17C 2221/012* (2013.01); *F17C 2223/0123* (2013.01); *F17C 2223/036* (2013.01); *F17C 2260/011* (2013.01); *F17C 2260/012* (2013.01); *F17C 2260/017* (2013.01); *F17C 2270/025* (2013.01); *Y02E 60/321* (2013.01)

(56) References Cited

FOREIGN PATENT DOCUMENTS

| GB | 2010720 A | 7/1979 |
| JP | 2002216709 A | 8/2002 |
| JP | 2007027046 A | 2/2007 |
| JP | 2009037979 A | 2/2009 |
| WO | 2010150649 A1 | 12/2010 |

OTHER PUBLICATIONS

Great Britain Search Report from corresponding GB Application No. GB1404558.7, dated Aug. 14, 2014.
France Search Report from corresponding FR Application No. 1352261, dated Nov. 7, 2013.
International Search Report from corresponding International Application No. PCT/JP2010/059672, mailed Aug. 10, 2010.
PCT International Preliminary Report on Patentability from corresponding International Application No. PCT/GB2014/050788, issued Sep. 15, 2015.

* cited by examiner

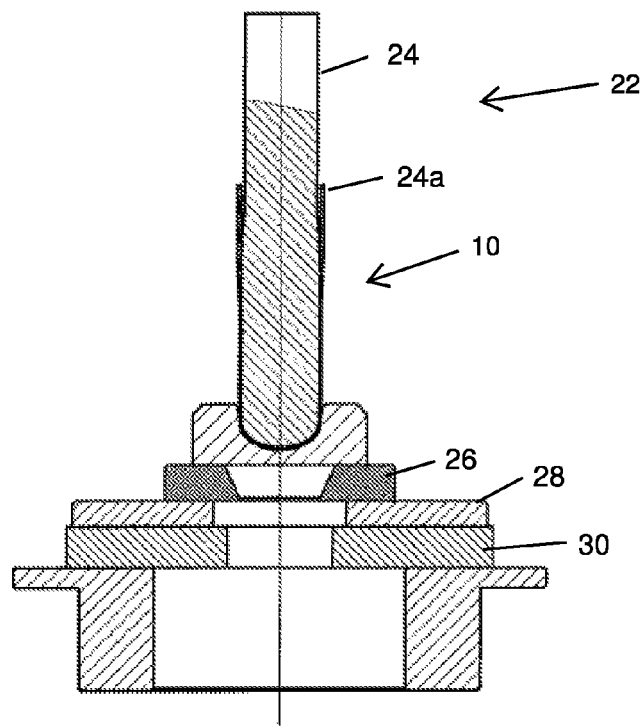
*Figure 4a*
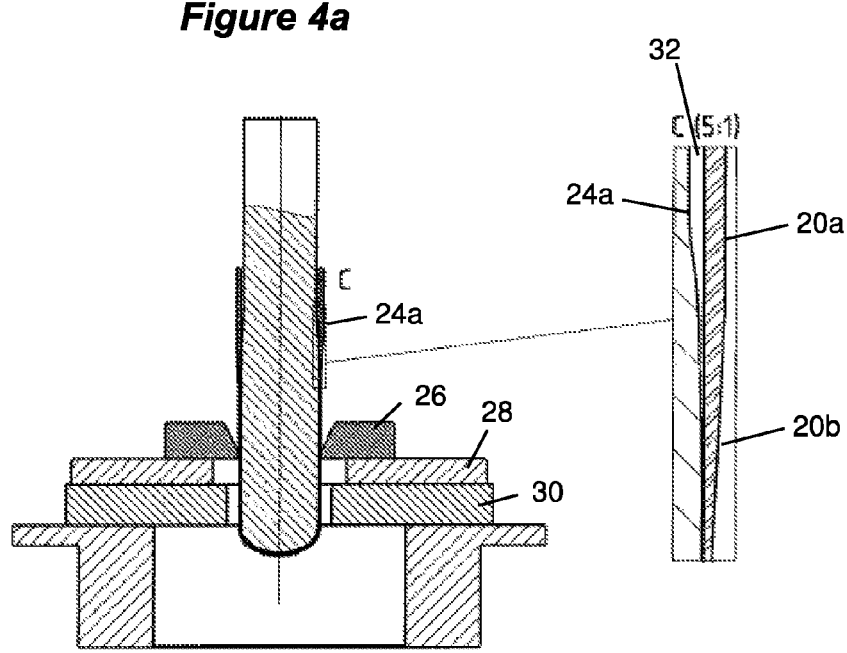
*Figure 4b*
*Figure 4c*

METHOD OF MANUFACTURING PRESSURE VESSEL LINERS

CROSS-REFERENCE TO RELATED APPLICATIONS

This application is a National Stage of International Application No. PCT/GB2014/050788, filed Mar. 14, 2014, which claimed priority to French Pat. Application No. FR 1352261, filed Mar. 14, 2013, the disclosures of which are incorporated herein by reference.

This invention relates to the manufacture of a cylindrical liner for use in a pressure vessel. In particular, the invention relates to the manufacture of seamless aluminium alloy pressure vessel liners having one closed end and the other with a threaded neck for attachment of fittings to the vessel.

A pressure vessel of the type with which this invention is concerned is generally used to contain fluids and gases, such as oxygen or calibration gases typically up to a pressure of around 300 to 380 bar, although in the case of hydrogen gas this may be up to 700 bar. In many applications, such as portable oxygen bottles for medical applications and self-contained breathing apparatus, the drive is to provide a vessel of minimum weight that can, at the same time, tolerate a high number of pressurisations and depressurisations without significant weakening. One solution is to provide a thin, impermeable liner made from lightweight material such as aluminium alloy (generally referred to simply as aluminium) or an elastomeric material. This material is relatively expansible and unable to withstand the internal pressures and so is reinforced by winding with carbon, aramid and/or glass fibres impregnated with a resin such as epoxy resin. The primary purpose of the liner therefore is to contain the fluid and to transmit gas pressure to the fibres. Aluminium liners also assist by taking some of the load. Best performance is achieved with a fully-wrapped liner. That is, one that is reinforced to take both longitudinal and circumferential stress. Fibres are accordingly wound around the cylindrical liner circumferentially and helically as close as possible to the longitudinal direction.

Fully wrapped aluminium liners are well known and have been produced for a number of years. The manufacturing method involves a number of steps that have been refined or added to over the years as product performance has improved. Early processes were based around the steps of extrusion, drawing and forming. Aluminium is extruded through a die at ambient temperature to obtain a hollow tube that is closed at one end. The tube is then drawn through a second die of reduced diameter in order to both reduce the diameter of the liner tube and strengthen the aluminium material. The tube is cut to length. Rounded ends of the vessel are formed by heating and then applying pressure to the tube as it is rotated in order to guide the material into a hemispherical end with longitudinal neck.

The requirement for a threaded neck means that the vessel must have a certain minimum thickness in the vicinity of the neck. That is, there must be enough material in the neck to permit it to support threading for attachment of a fitting. Moreover, the neck portion is less effectively wrapped in the finished cylinder and yet still required to resist the pressure exerted by stored gas on the fitting. These considerations effectively set a minimum limit for the amount of material that must be used in the neck. With the early prior art manufacturing methods, the vessel tube was made to uniform thickness. The thickness requirement at the neck therefore constrained the remainder of the vessel to the same thickness, with the result that the drum part was thicker than necessary. In consequence, the liner included excess material, which did nothing to reduce its cost and weight.

CA 2,151,862 describes a development of the early manufacturing processes in which the extruded aluminium tube is mounted in a flow forming machine. Rollers apply pressure to the tube to reduce the thickness of the drum region whilst retaining the thickness of the end regions. The end regions are then spin formed to produce substantially-closed dome-shaped ends with longitudinally extending necks.

Three processes are described in JP 2000/202552 that produce a cylinder with thinner walls in the drum region. The processes differ in the initial stages at which a tube or cup-shaped shell are formed. For example, a shell is formed by moulding an aluminium billet to shape between a punch and die. The result is a tube that is closed at one end. The central drum section of the tube is then reduced in thickness by ironing before the thicker open-ended region is closed by spinning.

Another approach to reducing the weight of the liner is to use a smaller amount of a stronger material. A range of aluminium alloys has been used in liner manufacture. Precipitation hardenable aluminium alloys are generally preferred, for example, the AA2xxx, AA6xxx, AA7xxx and AA8xxx series as defined in the International Alloy Designations and Chemical Composition Limits for Wrought Aluminum and Aluminum Alloys published by The Aluminum Association as revised June 1994. Stronger alloys however, such as AA7060, do not lend themselves to processing methods that have been used successfully for the weaker alloys such as AA6061.

There is therefore a perceived need for a new method of manufacturing aluminium liners that may be applied to a greater range of materials than possible with prior art methods. The object of this invention is therefore to provide such a manufacturing process that can be used effectively across a range of aluminium alloys, including the harder AA7xxx series. In particular the resultant liner, when fully wrapped, is potentially smaller and lighter than equivalent pressure vessels known in the prior art.

The present invention accordingly provides a method of manufacturing a liner for use in a pressure vessel, the method comprising the steps of:

(a) Providing a cup-shaped shell of an aluminium alloy, with closed crown end and open top, the shell having a drum region with thinner walls, an end region at the open top with thicker walls and an intermediate transition zone of tapering thickness;

(b) Cold drawing the shell using a punch with generally cylindrical walls and a shaped upper region that, during the drawing operation, meets with the transition zone of the shell;

(c) Forming the end region and transition zone to close the open top and to form a neck extending therefrom; and (d) Cutting a thread into the neck.

This invention is advantageous in that it is suitable not only for processing the softer aluminium alloys such as AA6061 but also AA7060 and AA7032 materials, which were previously considered relatively intractable materials for cold working. It has however, surprisingly, been found that cold working can be applied effectively to these materials, in particular if the transition zone of the cylinder is shaped by cold drawing in accordance with the method described herein.

In a preferred embodiment, the shaped upper region of the punch is generally inwardly extending and step of cold drawing includes the steps of:

(i) pushing the punch and shell into a die of diameter smaller than at least an outer diameter of the end region of the shell; and (ii) withdrawing the punch from the shell such that the cylindrical part of the punch further forms the transition zone of the shell.

During this cold drawing process, the transition zone is pushed inwards to meet the shaped upper region of the punch. As the punch is withdrawn, its lower, generally cylindrical part pushes the shaped transition zone back outwards and advantageously flattens its inner surface. This, in turn, causes the shaping imparted to the shell transition zone to be communicated to the outside of the shell. This shaping can be such that it is advantageous to further steps in the processing of the shell.

In particular, in embodiments for which the shaped upper region of the punch comprises a first inwardly curved portion of convex radius of curvature R1 adjacent a second inwardly curved portion of concave radius of curvature R2, it is found that the first portion protects the shell somewhat in its withdrawal from the punch, making it less susceptible to fracture, and the second portion effectively thickens the shell wall towards the end region of the shell. This latter effect is advantageous in the subsequent processing of the end region to close the top and form the neck of the liner.

R1 is preferably larger than R2 and preferably equal to twice R2±20%.

R1 and R2 may be determined by the equations $$R1 = \frac{1515 \times (Tfm - FTT)}{A}$$

$$R2 = \frac{675 \times (Tfm - FTT)}{A}$$

where the end region of the shell, after drawing, has thickness Tfm, the transition region has a wedge part, after drawing, with maximum thickness FTT and A is a constant of value between 11 and 60.

The die into which the punch and shell may be pushed during the cold drawing operation may further have a diameter that is smaller that an outer diameter of the drum region of the shell. This smaller diameter shell permits cold working to be carried out along the length of the shell, increasing its length, thinning the shell walls and strengthening the material throughout.

Prior to cold drawing, the cup-shaped shell with closed crown end and open top may be shaped by machining to provide the shell with drum region with thinner walls, the end region with thicker walls and the transition zone of tapering thickness. Alternatively, this shaped shell may be provided using methods known in the prior art, for example as described in JP 2002/202552. Machining is found to be more suitable however for processing the harder aluminium alloys, such as AA7060.

The cup-shaped shell is preferably formed by extruding the aluminium alloy. Alternatively, it may be formed by deep drawing.

In the method of this invention, the shell top and neck may be formed by spin forming.

The aluminium alloy is preferably a strong alloy such as one selected from the AA7xxx or AA2xxx series. In particular, it may be selected from the AA7xxx series and is preferably AA7060 and/or AA7032. These alloys are particularly strong aluminium materials whose use therefore enables a liner to be fabricated with a strength similar to those known in the art but using less material. Such a liner is consequently lighter and more portable than those of the prior art, improving its utility. The step of cold drawing may involve cold working the shell an amount between 15 and 38% and preferably an amount between 25 and 38%.

The invention will now be described, by way of example only, and with reference to the accompanying drawings, in which:

FIG. 4a is a schematic illustration of the machined liner at the start of a cold drawing process;

FIG. 4b is an illustration of the same liner as it undergoes initial stages of a cold drawing process;

FIG. 4c is an enlargement of box C of FIG. 4b, showing a shaped region of the cold drawing punch;

Figure 1:
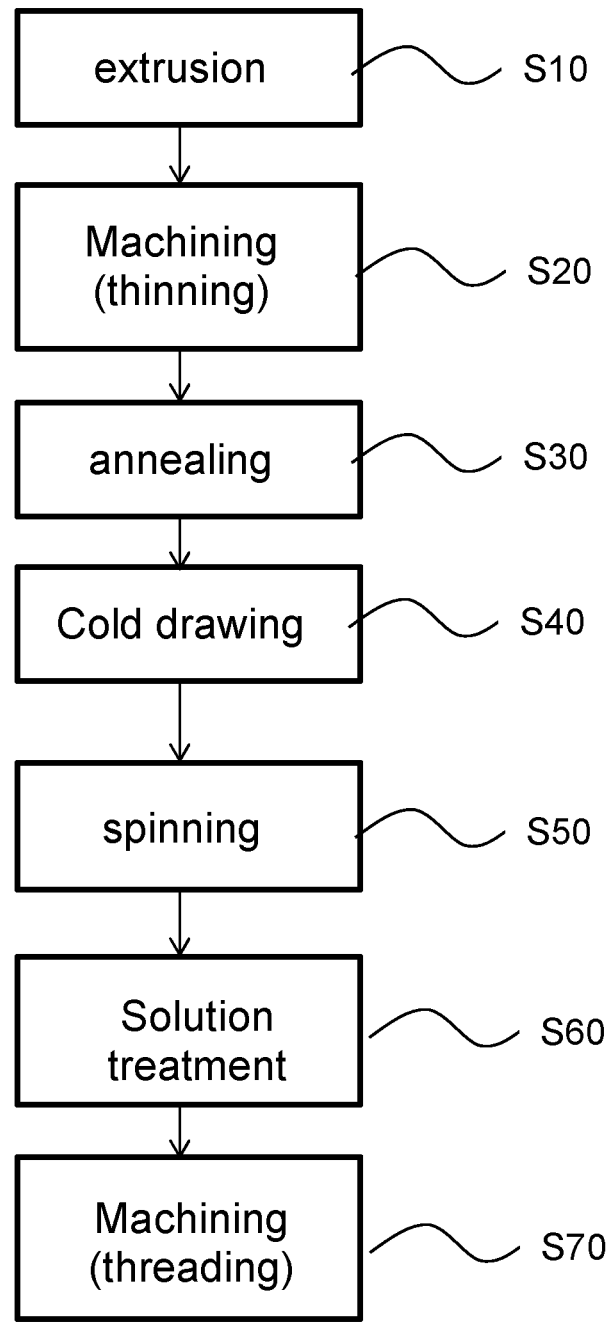
FIG. 1 is a flow chart showing the process steps involved in manufacturing a liner in accordance with this invention.

With reference to FIG. 1 and to the other Figures as appropriate, an example of a liner fabricated in accordance with the method of this invention will now be described.

Figure 2:
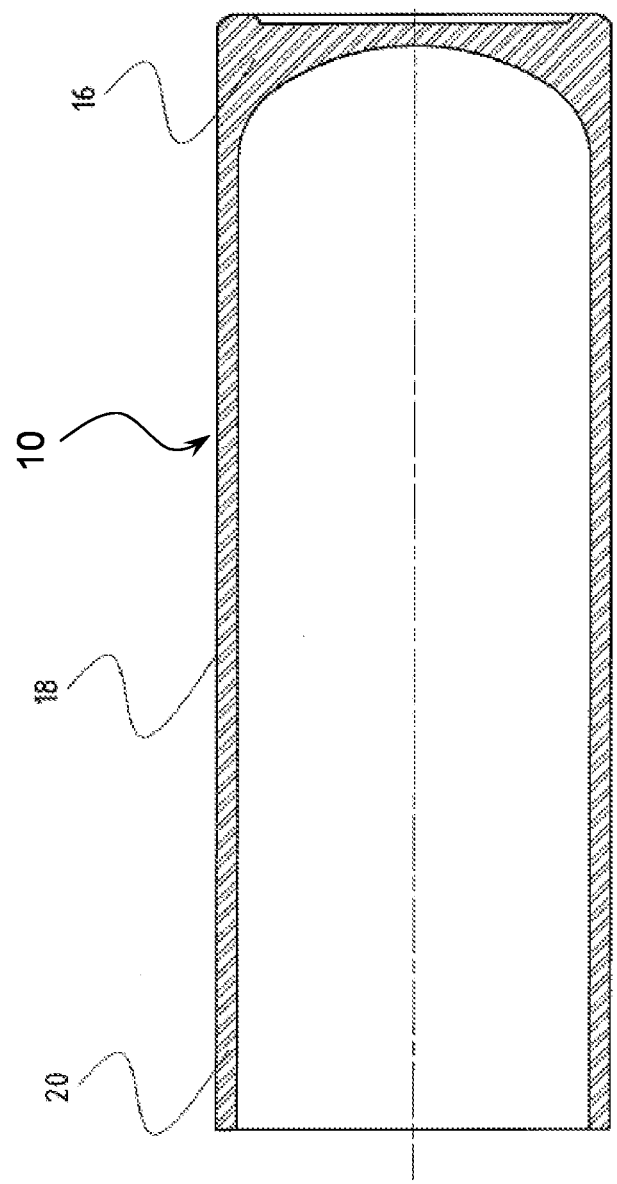
FIG. 2 is a cross-sectional view of a schematic illustration of a liner after extrusion in accordance with this invention.

At a first step S10, a round billet of AA7060 aluminium alloy is cold back extruded using a hydraulic press to form a shell. FIG. 2 shows an example of a shell 10 produced by this method. The press includes a punch with a diameter and domed base corresponding to the inner diameter and closed base of the shell respectively and a matched die having a shape corresponding to the external base end of the shell. The punch pushes the billet in its longitudinal direction into the die. The billet is back extruded around the punch to form a cup-shaped shell 10. The shell 10 comprises a rounded closed crown region 16, and a tubular 18, 20 part of uniform wall thickness. The tubular part 18, 20 can be further considered to comprise a drum region 18 and open end region 20.

Figure 3:
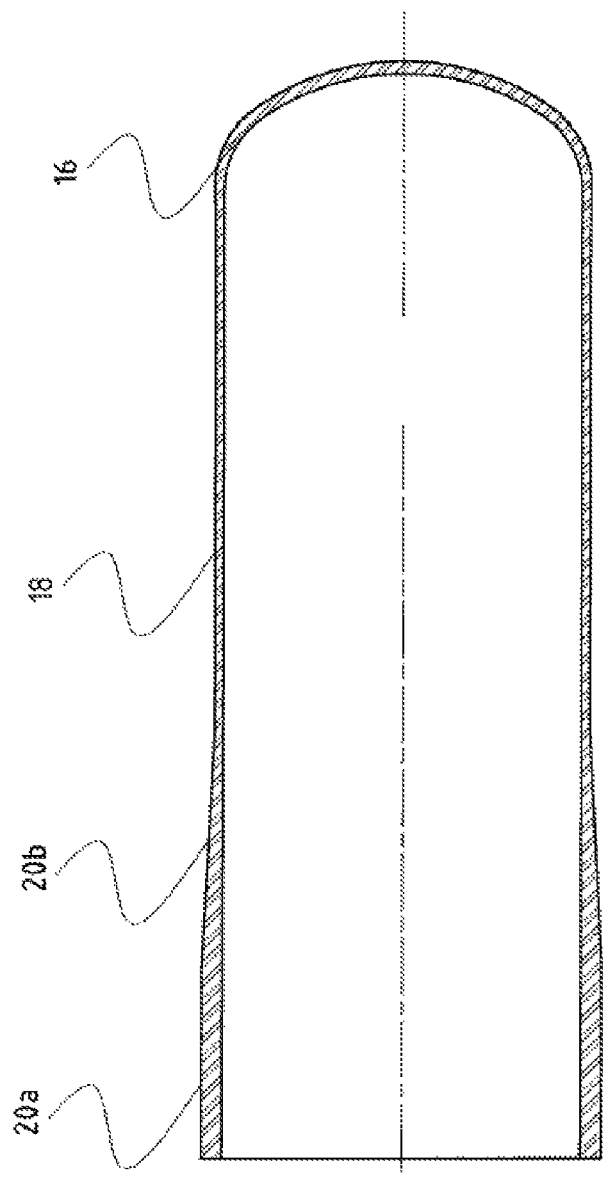
FIG. 3 shows the same liner after its shape is adapted by machining.

At a second step S20, the shell 10 is mounted in a computer numerical controlled (CNC) lathe for external machining. FIG. 3 shows the cross-sectional appearance of the shell 10 after machining. The purpose of the machining step S20 is to thin the walls of the drum region 18, which removes alloy material that is excess to strength requirements. A part 20a of the end region 20 near the shell opening is not, or is minimally, machined to retain substantially its original thickness. The remainder 20b of the end region, between the thicker end 20a and the thinner drum region 18 is machined to form a transition zone. In the transition zone 20b, the wall tapers generally linearly between the two thicknesses (of drum 18 and end 20a regions).

The shell 10 is next S30 annealed in order to soften the alloy in preparation for cold drawing. Annealing is carried out at a temperature in the range that is appropriate for the alloy being processed. In this embodiment, the shell material is of the AA7xxx series aluminium alloys, which is therefore annealed at a temperature of 385 to 405° C. for a time of 3 to 5 hours. The shell 10 is allowed to cool to room temperature.

Annealing S30 is followed by cold drawing S40. By cold drawing, we mean extending the shell such that its material deforms at a temperature below that at which significant recovery or recrystallisation occurs. It is preferably carried out at or close to ambient temperature.

Figure 4D:
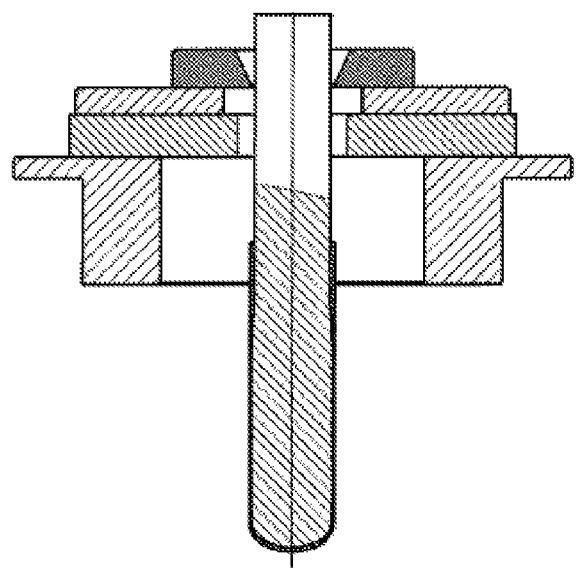
FIG. 4d is an illustration of the liner at the end of the cold drawing operation.

The sequence of steps involved in the cold drawing S40 process is shown in more detail in FIGS. 4a to 4e. With reference first to FIG. 4a, the shell 10 is illustrated in a cold drawing press 22. The shell 10 is lubricated and mounted on a punch 24, whose diameter and base generally match the inner diameter and crown 16 of the shell. The punch 24 is generally cylindrical with a shaped region 24a towards its upper part. This is shown in more detail in FIG. 4c. The press 22 includes the punch 24, a die 26 that is responsible for working the shell 10, a bolster 28 that supports various equipment (not shown) associated with controlling the process and a stripper plate 30. In FIG. 4a, the shell 10 and punch 24 are shown supported by a guide in preparation for the cold drawing process S40.

FIG. 4b shows the cold drawing press 22 at the start of cold drawing. The die 26 has the same overall shape as the shell 10 but its diameter is smaller than the outer diameter of the drum region of the shell. As the shell 10 is therefore pushed into the die, cold work is performed on its walls, which are thinned and elongated. That is, the overall length of the shell 10 is increased and its wall thickness decreased.

As mentioned above, the punch 24 includes a shaped region 24a. This is shown in more detail in FIG. 4c, which is an enlarged view of box C of FIG. 4b. The shaped region is gently curved. The lower part curves inwards (towards the inner part of the punch) with a convex radius of curvature R1. The shape then adopts a concave curvature with radius R2. As can be seen in FIG. 4c, prior to cold drawing, this leaves a gap 32 between punch 24 and inside surface of the shell 10. As cold drawing continues, the shell 10 is elongated until the wedge-shaped transition zone 20b is located adjacent the shaped region 24a of the punch, at which point the shaped region 24a is about to be pushed into the die 26. Further movement of the punch 24 into the die 26 results in the transition zone 20b being pressed against the shaped region 24a of the punch such that it is formed into a curved shape whose wall thickness varies along its length. The completion of the cold drawing cycle S40, when the shell has been entirely forced into the die 26, is shown in FIG. 4d.

Figure 4E:
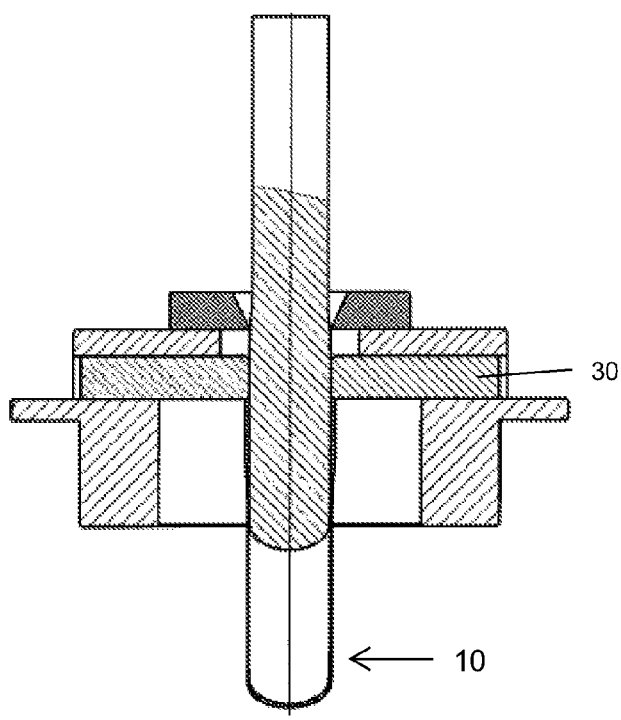
FIG. 4e is a schematic illustration of the liner being removed from the cold drawing punch.

FIG. 4e shows the shell 10 being removed from the punch 24. After the situation illustrated in FIG. 4d, the stripper plate 30 is moved inwards to meet the sides of the punch 24, above the shell 10. The punch 24 is then withdrawn from the die. As the shell 10 is raised with the punch, its edge is caught on the stripper plate 30. The punch 24 then continues its withdrawal and the shell 10 is removed. This withdrawal though causes further work to be carried out on the transition zone 20b. It will be recalled that the transition zone 20b was curved inwards during the cold drawing process. That is, the inner surface of the shell in this region is curved inwards, with diameter less than that of the rest of the shell 10 and also of the cylindrical part of the punch. As the punch is drawn upwards off the shell therefore, the shell transition zone 20b is smoothed on its inner surface. In consequence, the transition zone 20b is further reshaped and the curved deformations are transferred to the outer surface.

Figure 5:
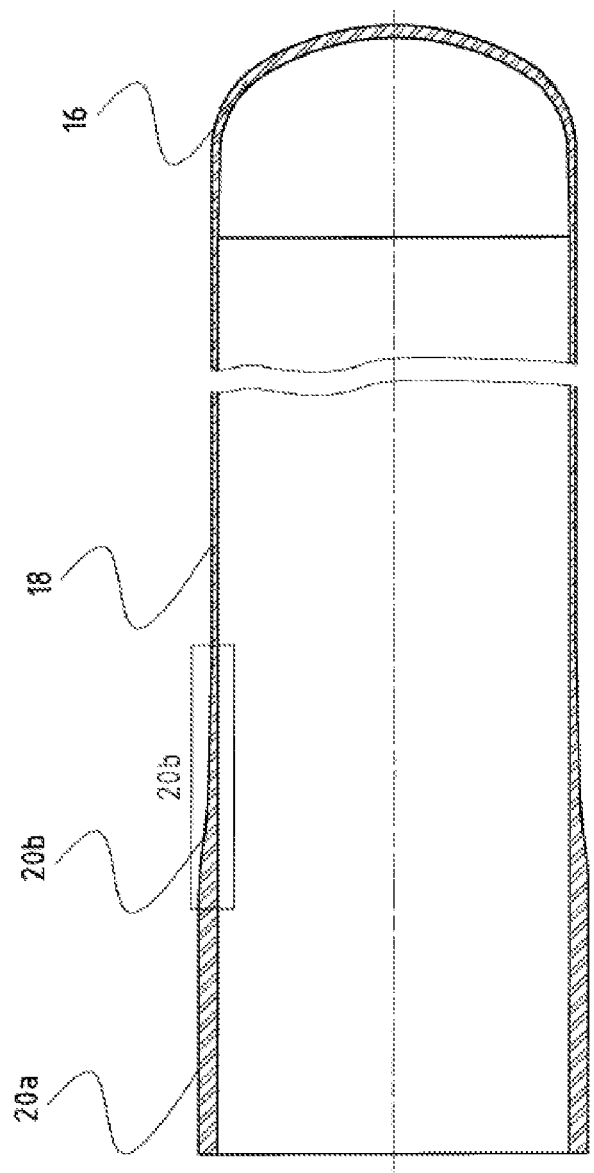
FIG. 5 is a cross-sectional view showing the elongation and shaping of the liner after cold drawing.

FIG. 5 is a cross-sectional view of the shell itself 10 after cold drawing. The result is an increase in length, in comparison with the pre-cold drawing shell 10 shown in FIG. 3, a decrease in wall thickness and a reshaping of the transition zone 20b. A cross-sectional view of the reshaped transition zone 20b in shown in more detail in FIG. 6.

Figure 6:
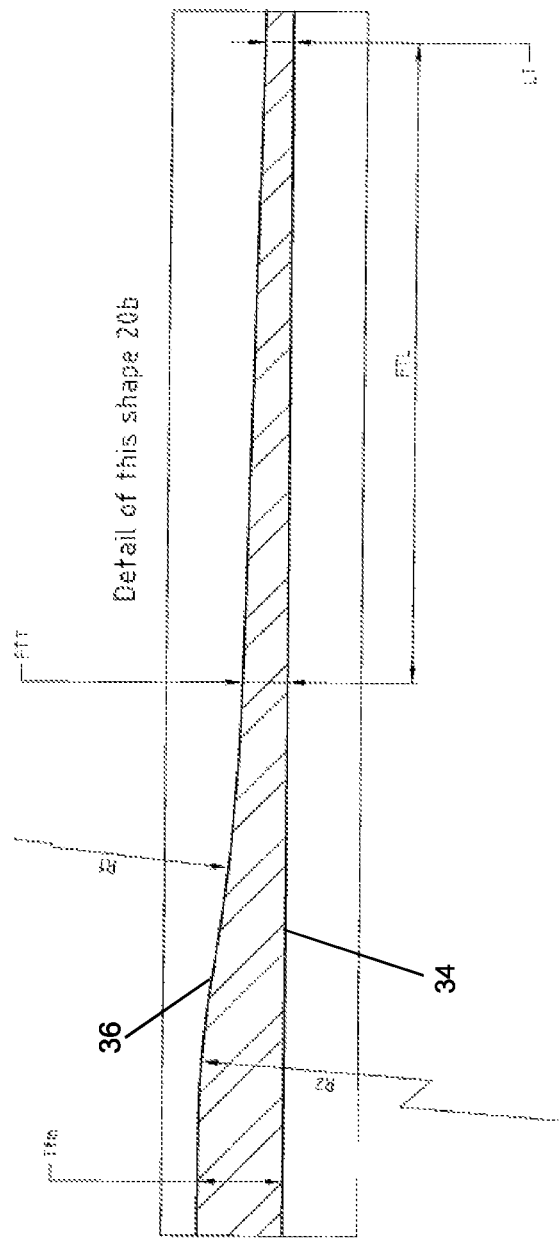
FIG. 6 is an enlarged illustration of part 20b of the liner of FIG. 5, showing the shape of the transition from thinner wall to thicker wall, which is important to this invention.

With reference to FIG. 6, an inner surface 34 of the liner shell is essentially smoothly cylindrical. In this cross-sectional view therefore, the inner surface 34 appears as a straight line, substantially parallel to a longitudinal axis of the cylinder. An outer surface 36 is formed by the cold drawing process S40 into a region with a generally curved increase in thickness. The (post-cold drawing) thickness LT of the drum 18 portion of the shell is marked on FIG. 6 at the point where the transition zone 20b begins to increase this thickness. For a first length FTL, the wall has a generally linear increase in thickness, forming, in cross-section, a shallow wedge angle α. After the length FTL, the surface 36 rises upwards, increasing the thickness of the shell wall with (concave) curved profile with relatively large radius of curvature R1. Thereafter the curvature becomes convex with radius of curvature R2 and the thickness of the shell wall increases up to the thickness Tfm of the thicker end of the shell. These radii of curvature R1 and R2 are approximately equal to those exhibited by the shaped region 24a of the punch 24 and so the same representative symbols will be used. It should be borne in mind however that there is some springback and other deformations inherent in removing the shell from the punch and so the assumed equality is only approximate.

There are a number of factors to consider in both the cold drawing operation and in setting the shape of the transition zone 20b. Such considerations are central to many embodiments of the method of this invention and will be addressed in detail later. For now, it suffices to appreciate that the cold drawing strengthens and thins the walls of the shell and adapts the shape of the transition zone 20b.

After cold drawing S40, the next step S50 is to spin form the end region 20a, 20b of the shell 10 into a substantially closed dome-shaped end cap 40 with outwardly extending neck 42. Spin forming is conventional and is a well known technique often used to form a neck part on a cylindrical container. It is, for example, used in both prior art procedures referenced above: CA 2 151 862 and JP 2000-202552. It will not therefore be described further.

The transition zone 20b and thicker end 20a are formed into the end cap 40 and neck 42 as follows. The linear wedge FTL forms the upper region of the cylindrical part of the shell. The first curved region R1 covers the first bend of the dome-shaped end cap, as the shell material is curved towards the centre. The second curved region R2 covers the second bend at which the end cap 40 starts to form the neck. The neck itself is formed from material predominately from the thicker end 42 of the shell.

An alternative to spin forming is multiple die forming in which the cap and neck are formed by small deformations imparted by successively shaped dies.

After spinning, the shell 10 is subjected to a solution treatment S60. Solution treatment is carried out by heating the alloy to a temperature at which all or most of the soluble elements are taken into solution (typically 400 to 545° C. for aluminium alloys) and then cooling at a sufficient rate to hold most or all of the soluble elements in solution. Solution treatment is followed by age hardening to increase alloy strength. In the specific example of the AA7060 alloy, ageing is performed as a two stage process, the temperature of the second stage being higher than that of the first. Solution treatment and age hardening are well known processing techniques and their application to aluminium alloys have been well documented. Process details will therefore be clear to one skilled in the art and so further elaboration is unnecessary. This heat treatment gives the liner the mechanical characteristics and corrosion resistance required for use as a high pressure vessel.

Figure 8:
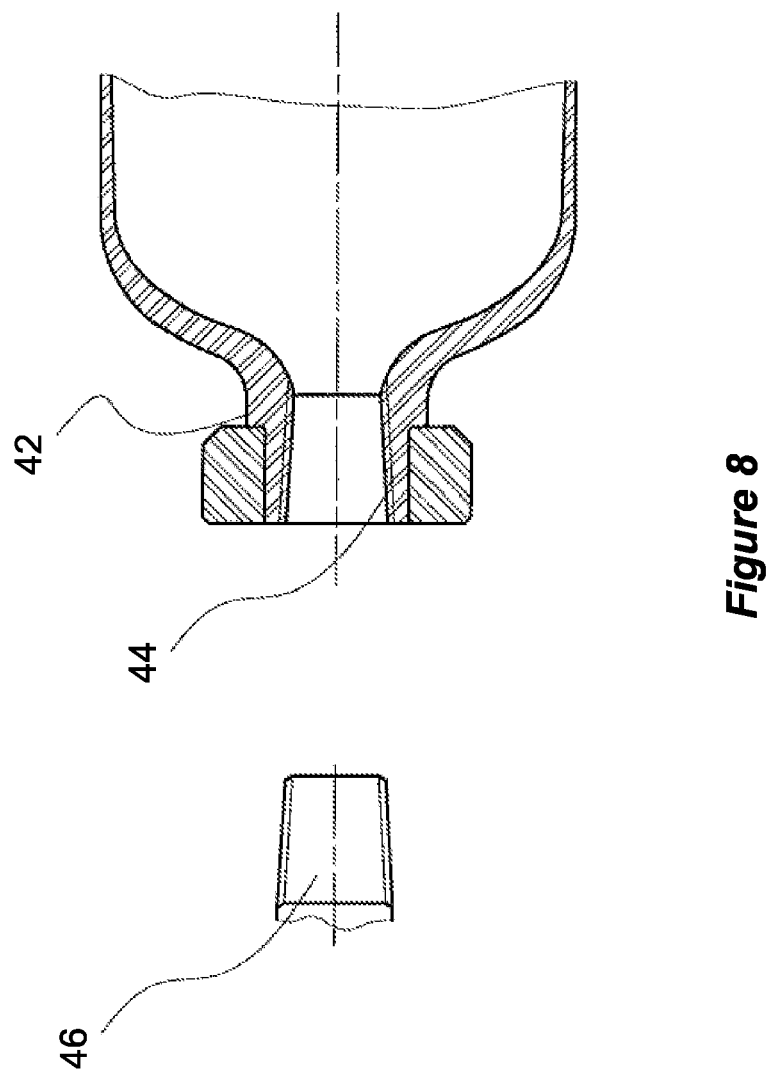
FIG. 8 is a cross-sectional illustration of the neck of the liner after threading in preparation for attachment of a valve fitting.

In the final stage S70 of liner manufacture in accordance with this invention, the shell 10 is again mounted in a CNC lathe for machining. With reference to FIG. 8, the lathe is used to cut a threaded region 44 into the internal part of the neck 42. This requirement is one of the reasons for the thicker neck portion: it must have sufficient wall thickness to allow the threading to be cut. Alternative embodiments may be externally threaded. A valve fitting 46 is screwed into the liner to close this end and in preparation for use.

In order to complete the process of cylinder manufacture, the liner 10 is reinforced with high-strength carbon fibres impregnated with epoxy resin. The fibres are wound in a conventional manner, for example both in helical and hoop directions, to provide resistance to both longitudinal and circumferential stresses. A layer of glass fibre also impregnated with epoxy resin is also wound on the cylinder to provide additional protection for the carbon fibre. The fibre/epoxy composite overwrap is then fully cured. Finally, the wrapped cylinder is subject to an autofrettage operation in order to increase durability by inducing residual compressive stresses.

Returning now to the cold drawing operation S40 and shaping of the transition zone 20b, the factors that contribute to determining the details of these parameters will now be set out.

The amount of cold work induced in the cylinder through drawing must be sufficient to produce a fine grain size after a subsequent annealing process. That is, to avoid secondary grain growth. This required amount depends on factors such as the composition of the alloy and specifics of the annealing process. Secondary grain growth is particularly prone to occur at relatively low degrees of cold work. In practice and for AA7060 alloy, 20% cold work (as defined by change in crown surface area) is likely to be the minimum requirement. If, on the other hand, the amount of cold working is too high, the shell 10 will fracture during processing. The series AA7xxx alloys are relatively difficult to process and particularly liable to fracture during a cold drawing operation. The upper cold working limit for AA7060 is found to be in the region of 38%.

This limitation applies primarily to the drum 18 and crown 16 portions of the shell. The thicker end portion 20 generally experiences less cold working at the drawing stage S40, but the process by which the neck is subsequently formed further alters the alloy microstructure rendering the effect of earlier processing less significant.

Referring again to FIGS. 4c-e, it can be seen that in removing the shell 10 from the punch 24, a force is applied from the punch to the inwardly oriented transition zone 20a, forcing it outwards. The effect of this force is felt most strongly at the onset of the first curvature R1. That is, when the initial wedge shape starts to curve inwards after a distance FTL. The radius of curvature is therefore kept relatively large, in order to distribute this force along a longer length of shell and therefore to reduce the likelihood of material fracture.

Figure 7:
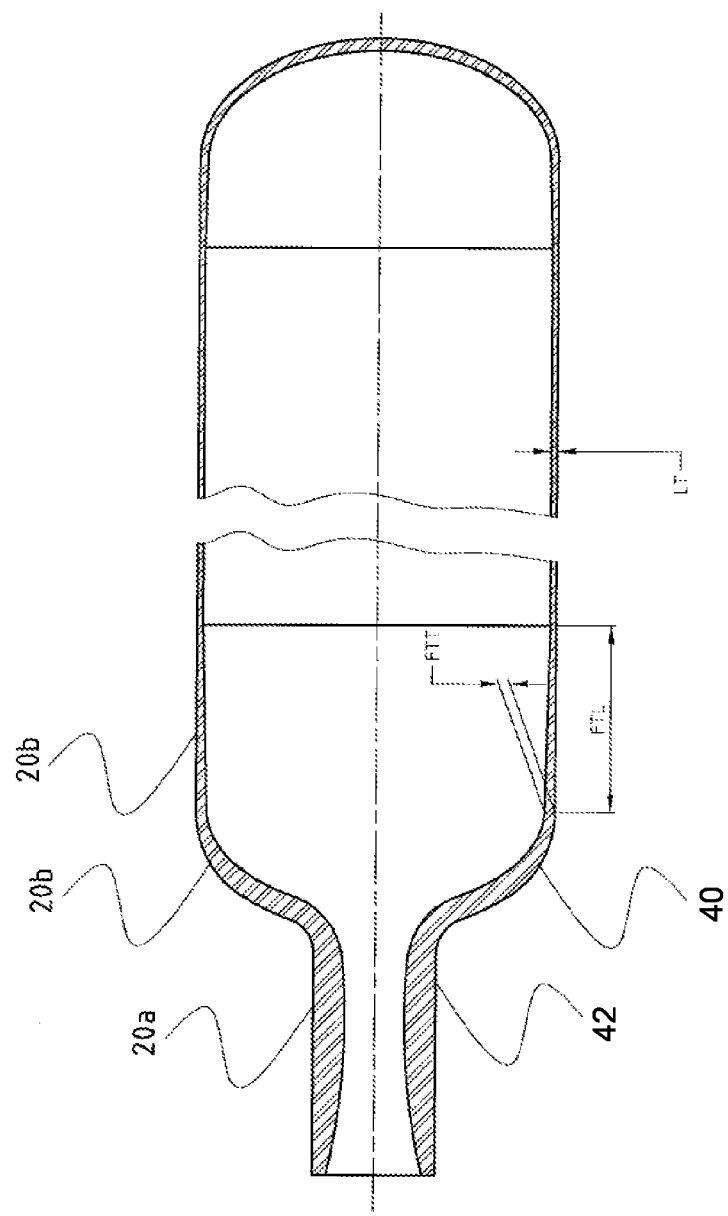
FIG. 7 is a cross-sectional illustration of the liner after undergoing a spinning process to form a neck.

With reference to FIG. 7, it is clear that it is desirable to have more shell material at the neck region i.e. at the thicker end of the transition zone 20a, in order to support the threading. Referring back to FIG. 6, it can be seen that the effect of reshaping the transition zone 20b from the wedge shape that was the result of the initial machining step S20, is to remove some material from the middle part of the wedge and relocate it to the thicker part. Material reduction and the large radius of curvature of the first nonlinear part assist in cold drawing and removal of the shell from the cold drawing punch. Material addition to the upper part assists in the spinning or other neck-forming procedure. The value of R1 is preferably around twice the value of R2.

Figure 9:
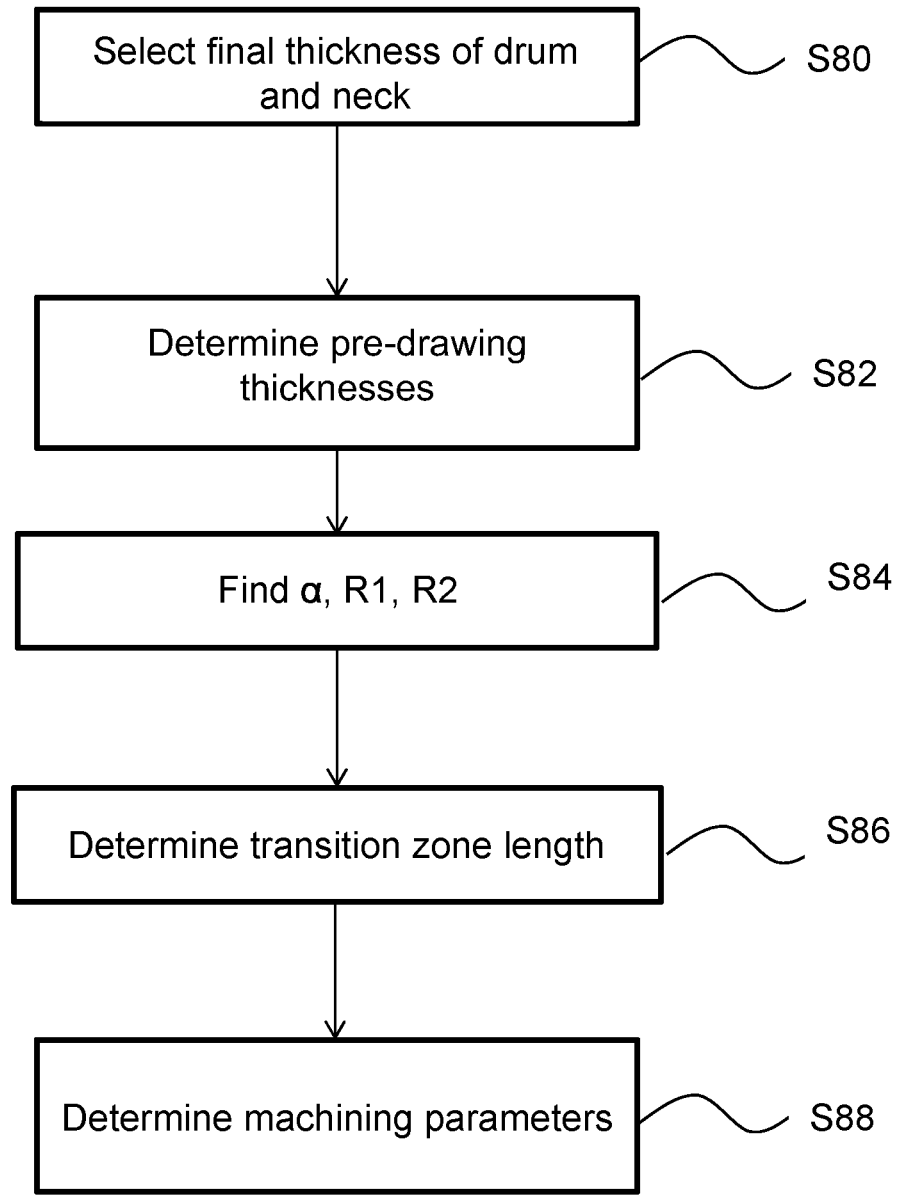
FIG. 9 is a flow chart showing the process steps involved in designing the shaped region of the cold drawing punch in order to fabricate a liner in accordance with this invention.

FIG. 9 sets out the steps involved in designing the transition zone for a particular liner construction. This is made with reference to the cold drawing process and is essentially a working back of requirements through the manufacturing process. Initially S80, post-drawing thicknesses of the neck portion and drum portion of the shell are chosen to achieve the objectives of the final cylinder design, for example, pressure resistance in accordance with design standard, weight of cylinder, etc. Drawing ratio tolerances then determine S82 pre-drawing thicknesses of the drum and end regions. After cold drawing, experience has shown that, for AA7060 alloys, the wedge angle α is preferably between 1.5° and 3°. R1 and R2 (for the punch) are determined S84 by the following formulae:

$$R1 = \frac{1515 \times (Tfm - FTT)}{A}$$

$$R2 = \frac{675 \times (Tfm - FTT)}{A}$$

where Tfm is the thickness of the shell end region 20a, FTT is the thickness at the end of the linear wedge-shaped part of the transition zone and A is a constant. The value of A is between 11 and 60.

From the values of FTL, R1 and R2, the length of the transition zone 20b can be determined S86. This can be used to determine S88 the length before cold drawing and hence the shape and size of wedge that should be machined initially into the shell.

In the specific example on which the illustrations in FIGS. 3 and 5 are based, cold drawing is not distributed evenly about the shell 10. The length of the shell 10 is increased from 235 mm to 290 mm. That is, an extension of 23%. The drum region 18 is reduced from 1.75 to 1.3 mm and the end region 20a from 4.4 to 4.0 mm. That is, by 26% and 9.1% respectively. In order to obtain a measure of the amount of cold work performed on the shell 10 in this drawing stage S40 a useful measure is the ratio of the surface area of the crown part 16 before and after drawing.

A liner was manufactured using AA7060 aluminium alloy and its performance compared with that of a typical prior art AA6061 alloy liner. Both yield stress and ultimate tensile strength of the AA7060 liner were found to have been increased.

The invention claimed is:

1. A method of manufacturing a liner for use in a pressure vessel, the method comprising the steps of:
   (a) providing a cup-shaped shell (10) of aluminium alloy, with closed crown end (16) and open top, the shell having a drum region (18) with thinner walls, an end region (20a) at the open top with thicker walls and an intermediate transition zone (20b) of tapering thickness;

(b) cold drawing the shell using a punch (24) with generally cylindrical walls and a shaped upper region (24a) that, during the drawing operation, meets with the transition zone (20b) of the shell;

(c) forming the end region (20a) and transition zone (20b) to close the open top and to form a neck (32) extending therefrom; and (d) cutting a thread into the neck.

2. A method according to claim 1 wherein the shaped upper region (24a) of the punch is generally inwardly extending and the step of cold drawing includes the steps of:

(i) pushing the punch (24) and shell (10) into a die of diameter smaller than at least an outer diameter of the end region (20a) of the shell; and (ii) withdrawing the punch from the shell (10) such that the cylindrical walls of the punch further forms the transition zone (20b) of the shell.

3. A method according to claim 2 wherein step b(ii) results in a flattening of an inner surface of the transition zone (20b) of the shell.

4. A method according to claim 1 wherein the shaped upper region (24a) of the punch comprises a first inwardly curved portion of convex radius of curvature R1 adjacent a second inwardly curved portion of concave radius of curvature R2 and the step of cold drawing includes the steps of:

(i) pushing the punch (24) and shell (10) into a die of diameter smaller than at least an outer diameter of the end region (20a) of the shell; and (ii) withdrawing the punch from the shell (10) such that the cylindrical walls of the punch further forms the transition zone (20b) of the shell.

5. A method according to claim 4 in which R1 is larger than R2.

6. A method according to claim 4 in which R1=2× R2±20%.

7. A method according to claim 4 in which R1 and R2 are set by the equations $$R1 = \frac{1515 \times (Tfm - FTT)}{A}$$

$$R2 = \frac{675 \times (Tfm - FTT)}{A}$$

where the end region (20a) of the shell, after drawing, has thickness Tfm, the transition region has a wedge part, after drawing, with maximum thickness FTT and A is a constant of value between 11 and 60.

8. A method according to claim 2 in which the die has a diameter smaller than that of the drum region (18) of the shell.

9. A method according to claim 1 in which Step (a), the step of providing the cup-shaped shell, includes the steps of:

(i) providing the cup-shaped shell (10) with closed crown end (16) and open top; and (ii) machining the cup-shaped shell to produce the shell with drum region (18) with thinner walls, the end region (20a) with thicker walls and the transition zone (20b) of tapering thickness.

10. A method according to claim 9 in which the cup-shaped shell (10) is formed by extruding the aluminium alloy.

11. A method according to claim 1 in which the Step (c) is carried out by spin forming.

12. A method according to claim 1 wherein the aluminium alloy is a strong alloy such as one selected from the AA7xxx or AA2xxx series.

13. A method according to claim 1 wherein the aluminium alloy is selected from the AA7xxx series.

14. A method according to claim 1 wherein the aluminium alloy is AA7060.

15. A method according to claim 1 in which the step of cold drawing involves cold working the shell an amount between 15 and 38%.

16. A method according to claim 15 in which the cold working is an amount between 25 and 38%.

* * * * *